Figure 1:
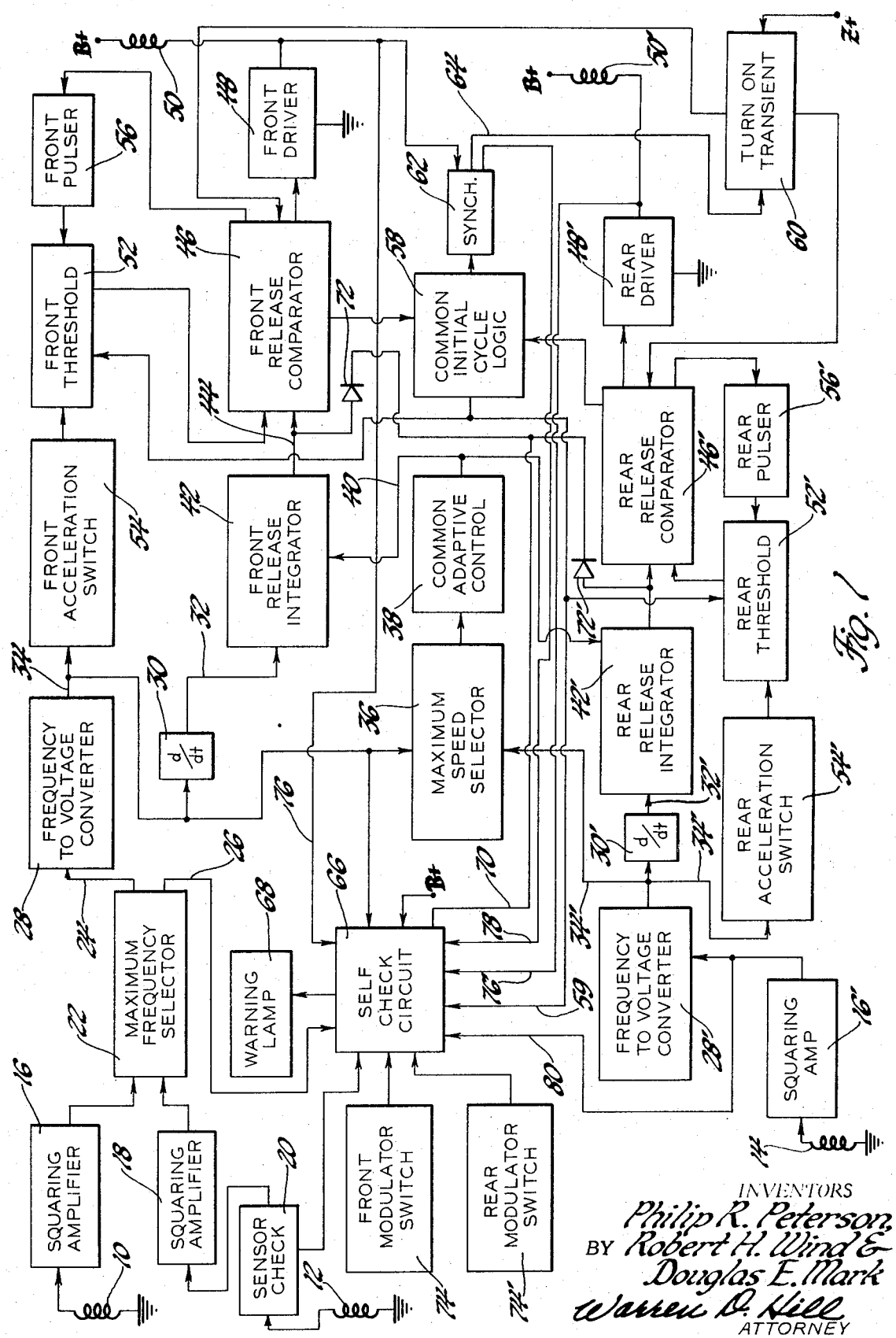

United States Patent
Peterson et al.

[15] 3,680,923
[45] Aug. 1, 1972

[54] ANTI-LOCK BRAKE CONTROL WITH SENSOR MONITORING CIRCUIT

[72] Inventors: Philip R. Peterson, Flint; Robert H. Wind, Grand Blanc; Douglas E. Mark, Davison, all of Mich.

[73] Assignee: General Motors Corporation, Detroit, Mich.

[22] Filed: March 15, 1971

[21] Appl. No.: 123,985

[52] U.S. Cl. ............303/21 AF, 180/105 E, 303/20, 317/9 D, 324/51, 324/73 R, 340/52 R
[51] Int. Cl. ..............................................B60t 8/08
[58] Field of Search.............180/82, 105 E; 188/181; 303/20, 21; 317/9; 324/51, 73; 340/52 R

[56] References Cited

UNITED STATES PATENTS

| | | | |
|---|---|---|---|
| 3,017,145 | 1/1962 | Yarber | 303/21 P |
| 3,275,384 | 9/1966 | Hirzel | 303/21 EB |
| 3,516,715 | 6/1970 | Fielek, Jr. et al. | 303/21 AF |
| 3,578,819 | 5/1971 | Atkins | 303/21 P |
| 3,602,554 | 8/1971 | Ichimura et al. | 303/21 AF |
| 3,499,689 | 3/1970 | Carp et al. | 303/21 P |
| 3,494,671 | 2/1970 | Slavin et al. | 303/21 P |

Primary Examiner—Milton Buchler
Assistant Examiner—Stephen G. Kunin
Attorney—Jean L. Carpenter, Paul Fitzpatrick and Warren D. Hill

[57] ABSTRACT

A four-wheel anti-lock brake control has at least three wheel speed sensors, each having one side grounded. One sensor for a non-driven wheel is monitored to assure circuit continuity between the sensor and the control circuit. All the sensor outputs are monitored by a self-check circuit to detect any sensor malfunction and to disable the control in the event of a malfunction. The self-check circuit further disables the control if a substantially zero rear wheel speed is indicated during periods of substantial front wheel speed, thus preventing the occurrence of anti-lock brake cycling in the front wheels when the rear wheels approach a lock-up condition. The self-check circuit further disables the control when any brake modulator is not in its normal position prior to a request by the control for anti-lock operation. In each case, the self-check circuit will disable the control only after some predetermined time delay. Two different time delays are accomplished using a single timing capacitor. A circuit is provided to release the rear brakes briefly when and if the front brakes are released first by the anti-lock control.

6 Claims, 3 Drawing Figures

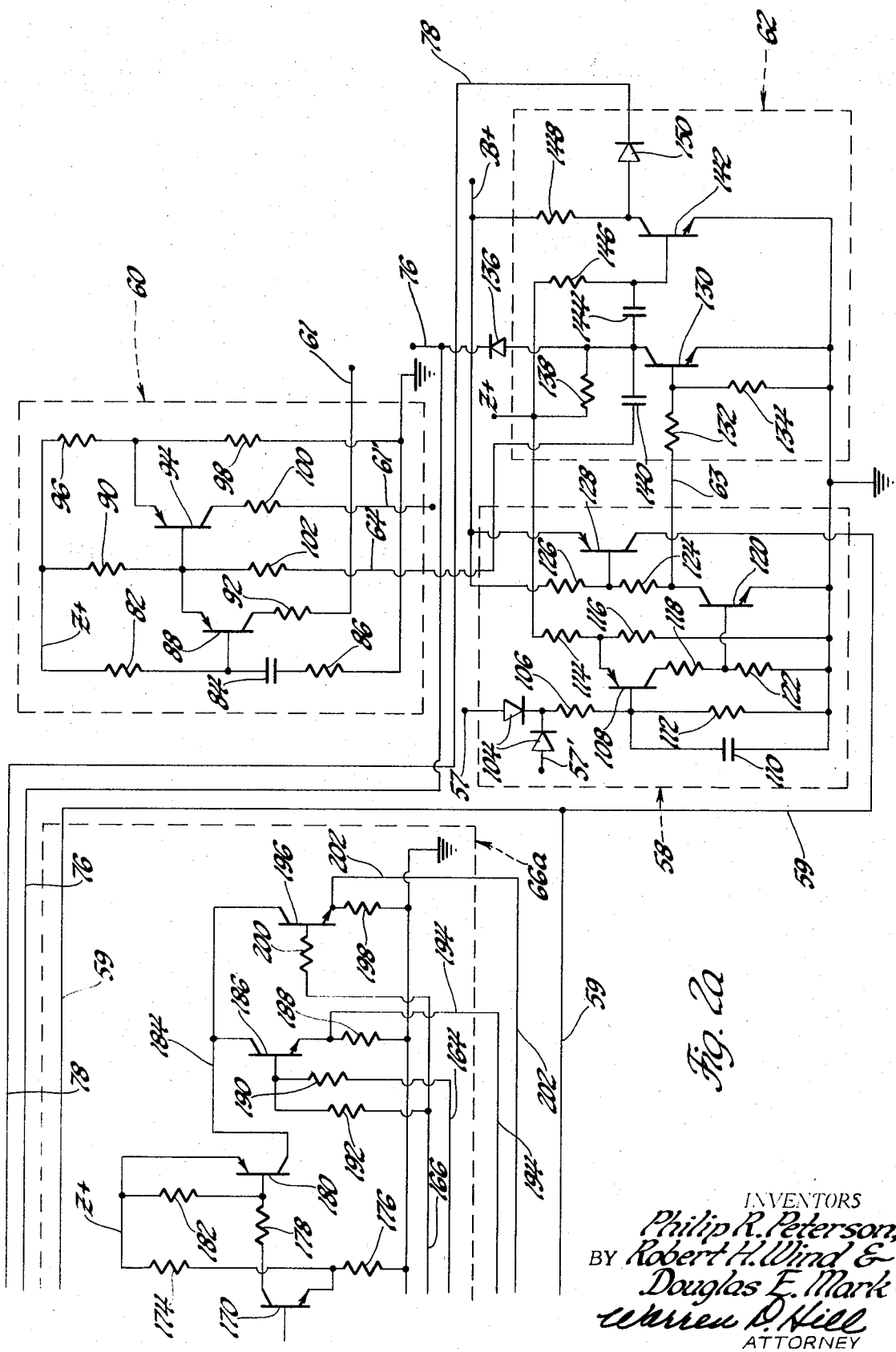

ANTI-LOCK BRAKE CONTROL WITH SENSOR MONITORING CIRCUIT

This invention relates to an anti-lock brake control for a vehicle and particularly to a self-check circuit for monitoring malfunctions thereof.

In anti-lock brake controls it is desirable to monitor the various portions of the control to assure its correct operation and, in the event of a malfunction, to disable the control so that normal conventional braking operation is available. In particular, it is desirable to monitor wheel speed sensors to assure that they have been properly connected to the circuit during vehicle assembly or repair and that the sensors properly respond to wheel rotation. In the patent application Van Ostrom et al., Ser. No. 806,807, filed Mar. 13, 1969, now abandoned there is described a circuit for monitoring sensor circuit continuity. However, it is there required to sense the potential at the low voltage side of the sensor so that two conductors must be provided between the sensor and the control.

It is therefore a general object of this invention to provide in an anti-lock brake control a circuit for checking wheel sensor continuity with one side of the sensor connected directly to ground.

It is another object of the invention to provide in an anti-lock brake control a circuit for monitoring wheel sensor output levels as well as continuity and to disable the control in the event of a malfunction.

It is another object of the invention to provide a circuit in an anti-lock brake control to detect malfunctions in wheel speed sensors by monitoring the performance of circuits which operate upon the sensor outputs.

The invention is carried out by providing an anti-lock brake control for both front and rear wheels of a vehicle including a circuit for sensing the continuity of one non-driven wheel sensor and for detecting the absence of a signal from one sensor when a non-driven wheel sensor indicates a predetermined minimum vehicle velocity and a timing circuit for disabling the anti-lock brake control within a preset time after a continuous sensor malfunction has been detected.

Figure 2:
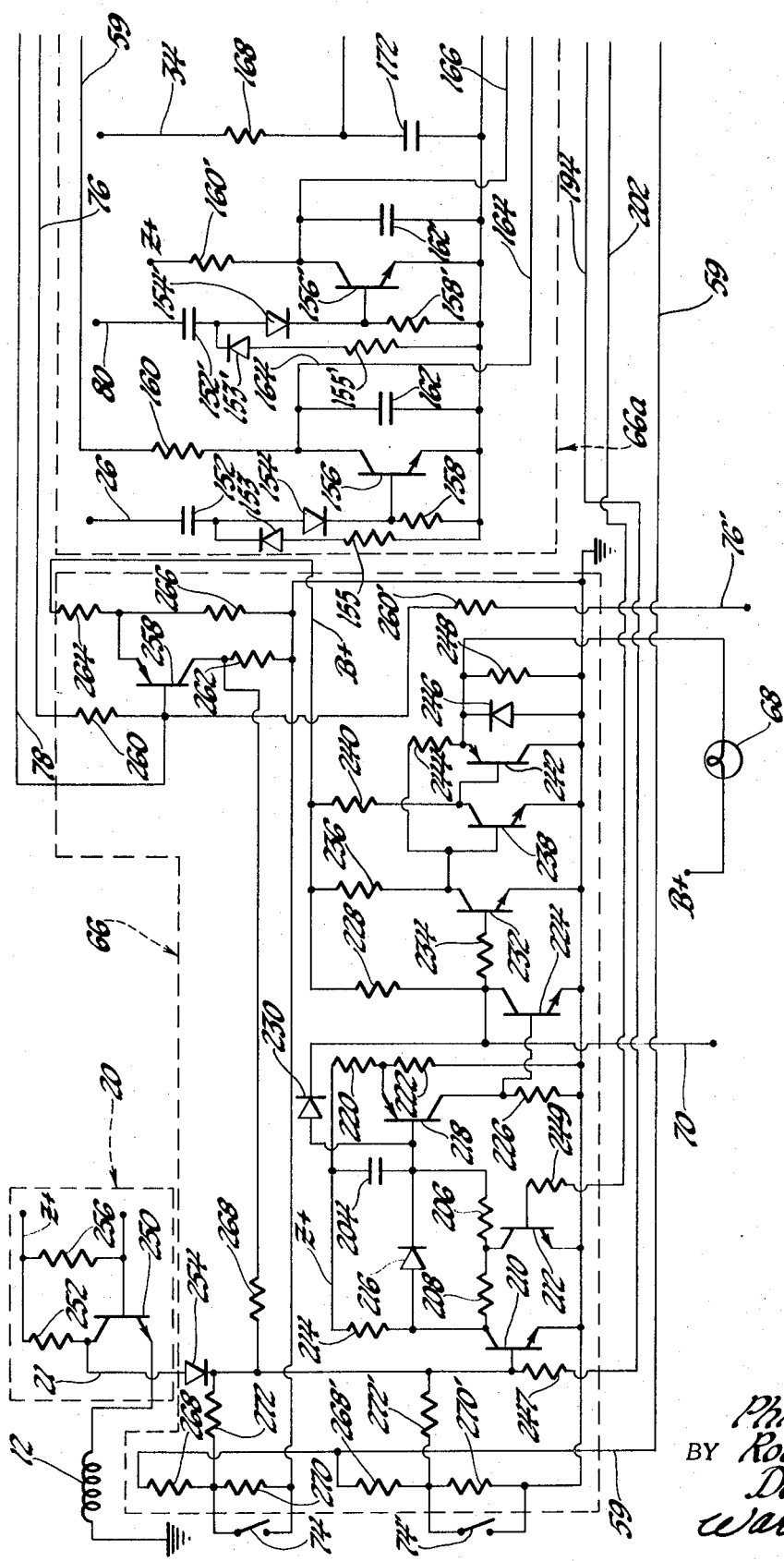

The above and other advantages will be made more apparent from the following specification taken in conjunction with the accompanying drawings wherein like reference numerals refer to like parts and wherein:

FIG. 1 is a block diagram of an anti-lock brake control circuit including self-check circuits according to the invention; and, FIGS. 2 and 2a comprise a schematic diagram of the self-check circuits according to the invention.

In general, the subject anti-lock brake control is patterned after that described in the aforementioned Ser. No. 806,807 wherein a control circuit senses braked wheel speed and detects incipient wheel lockup and then calls for a release of brake pressure to allow wheel speed recovery and upon recovery effecting brake reapplication and repeating the release-apply cycle as often as required. The rear brake pressure modulation is achieved by a vacuum operated pressure modulator like that disclosed in the U.S. Pat. to Harned et al. No. 3,524,685 or the aforementioned U.S. Ser. No. 806,807. The front brake pressure modulation is carried out by a hydraulically operated pressure modulator like that disclosed in the patent application of Woodward, Ser. No. 78,465 filed Oct. 6, 1970. The modulators are operated by a solenoid operated control valve and so arranged that brake release occurs upon energization of the solenoid and the brakes are applied when the solenoid is not energized.

In particular, the subject anti-lock control comprises a pair of two-wheel anti-lock brake control circuits interlocked for cooperative action with certain elements common to both circuits. A single self-check circuit serves the entire system. The subject system, then, utilizes two brake pressure modulators, one for the front wheels, and one for the rear wheels. While the subject invention is in principle applicable to either conventional rear drive vehicles or front drive vehicles, it is described herein in terms of a rear drive vehicle and as such, utilizes a single rear wheel sensor driven according to the average rear wheel speeds and an individual sensor for each non-driven front wheel.

Referring to FIG. 1, there is shown a left front wheel speed sensor 10, a right front wheel speed sensor 12, and a rear wheel speed sensor 14. The sensors are preferably of the well-known toothed wheel variable reluctance electromagnetic transducer type. The front sensors 10 and 12 are driven directly by the respective wheels while the rear sensor detects the speed of the propeller shaft or some other drive member proportional to average rear wheel speed. The sensor 10 is connected directly to a squaring amplifier 16 and the sensor 12 is connected to a squaring amplifier 18 through a sensor check circuit 20 which monitors circuit continuity of the sensor 12. The squaring amplifiers 16 and 18 are connected to a digital maximum frequency selector 22 which produces an output signal on line 24 comprising a square wave signal having a frequency proportional to the fastest front wheel and produces on line 26 a similar output signal corresponding to the speed of the slowest front wheel. Such a maximum frequency selector may be a circuit like that of Bolz U.S. Ser. No. 714,403 filed Mar. 22, 1968 provided with gates to channel the input signals to the appropriate output. The line 24 is connected to a frequency-to-voltage converter 28 which produces a DC output which varies according to maximum front wheel speed. That output is differentiated by a differentiator 30 to produce on line 32 a DC signal representative of a wheel acceleration.

The rear sensor 14 is connected to a squaring amplifier 16' which in turn is connected to a rear frequency-to-voltage converter 28' and differentiator 30' to produce on line 32' a rear wheel acceleration signal. Lines 34 and 34' from the frequency-to-voltage converters 28 and 28' respectively, are connected to an analog circuit 36 for selecting the highest signal representing the maximum speed of the front or rear wheels. The output of that circuit drives a common adaptive control circuit 38 which differentiates the maximum speed signal and applies a short time delay to the resulting deceleration signal so that its output on line 40 is a rough approximation of vehicle deceleration. The deceleration signal on line 40 is then used as a reference signal which is compared to the wheel deceleration signal on line 32. The front release integrator 42 integrates the difference between the wheel deceleration and simulated vehicle deceleration to produce a velocity error signal on line 44 which represents the difference between wheel speed and vehicle speed. The front release comparator 46 compares the velocity error signal on line 44 to a threshold, normally about 2 mph, and produces an output when the threshold is exceeded to energize the front driver 48 which in turn connects the solenoid 50 to ground to energize the solenoid, the other end of the solenoid being connected to a B+ potential. A front threshold circuit 52 modifies the threshold of the release comparator 46 in response to signals from a front acceleration switch 54, a front pulser 56 and a common initial cycle logic circuit 58. The acceleration switch 54 senses the wheel speed signal on line 34. When, during wheel speed recovery, wheel acceleration exceeds a preset value, the acceleration switch 54 produces an output causing the front threshold circuit 52 to increase the threshold to force a brake application signal. The front pulser 56 has an input from the release comparator 46 and senses brake application whereupon the front pulser produces an output for about 150 milliseconds which causes the front threshold circuit 52 to increase the threshold for that time period. This increase is intended to mask spurious signals on line 44 caused by wheel hop which is particularly prominent upon brake application on high coefficient surfaces.

The initial cycle logic 58 has as inputs signals from the front release comparator 46 and a rear release comparator 46'. Its output is connected to the front threshold circuit 52 as well as the rear threshold circuit 52'. The initial cycle logic produces an output signal prior to anti-lock brake release which causes an increase in the threshold. However, upon release of either front or rear brakes as signaled by either release comparator 46 or 46', the initial cycle signal terminates to reduce the threshold to its normal value.

As will be seen in FIG. 1, those elements in the rear control circuit not already mentioned and denoted by prime numerals correspond to elements in the front control circuit and operate in the same manner. The basic circuit operation and elements as thus far described are more fully explained in Ser. No. 806,807 and as those elements form no part of the present invention, further description is not believed necessary.

The common turn-on transient circuit 60 is energized when the vehicle ignition system is first actuated to produce pulses to the comparators 46 and 46' causing a very brief brake release for the purpose of exercising those mechanical parts which otherwise may rarely be used. A synchronization circuit 62 is responsive to the output of the initial cycle logic 58 and to the output of the front driver 48 to produce a pulse on line 64 when a front release takes place and the initial cycle logic has an output. This pulse on line 64 energizes the turn-on transient circuit 60 to produce a pulse to the rear release comparator 46' only to effect a brief release of the rear brake. Thus if anti-lock control of the brakes is initiated by the release of the front brakes, then the rear brakes will be released simultaneously for a brief period. With this release, the initial cycle logic output terminates and the front and rear control systems become free to operate asynchronously for the remainder of the controlled stop. The purpose of this arrangement is to overcome a characteristic of conventional master cylinders which, under certain circumstances, causes excessive brake pressure to build up in the rear system upon the initial front anti-lock release.

The self-check circuit 66 comprises a logic circuit responsive to many inputs to detect a system malfunction, the timing circuit, (triggered when an apparent malfunction occurs), and an output circuit energized upon expiration of the timer period for illuminating a warning lamp 68 and for disabling the control circuits by grounding the inputs of the front and rear release comparators 46 and 46' via line 70 and diodes 72 and 72'. The several inputs comprise front and rear modulator switches 74 and 74', the sensor check circuit 20, the line 26 carrying the minimum front speed signal from the select maximum front speed circuit 22, lines 76 and 76' from the front and rear solenoids 50 and 50', the line 34 carrying the maximum front speed signal, line 78 from the synchronizing circuit 62, the initial cycle signal on line 59 and the output of the rear squaring amplifier 16' on line 80.

FIGS. 2 and 2a of the drawings shows in detail the turn-on transient circuit 60, the common initial cycle logic circuit 58, the synchronization circuit 62, the sensor check circuit 20 and the self-check circuit 66,66a. The wheel sensor logic circuit 66a has been broken out of the main self-check circuit 66 for clarity of explanation and illustration. Two power supplies, not shown, are used to drive the circuits. One power supply is the vehicle battery B+ having a nominal value of 12v and a regulated power supply Z+ provides 8.2 volts.

The turn-on transient circuit 60 includes a resistor 82, a capacitor 84 and a resistor 86 serially connected between Z+ and ground. A transistor 88 has its base connected above the capacitor 84, its emitter connected to Z+ through a large resistor 90 and its collector connected through a resistor 92 to output line 61 which leads to the front release comparator 46. The second transistor 94 has its emitter connected to the junction of voltage dividing resistors 96 and 98 which extend between Z+ and ground. The base of the transistor 94 is connected to the emitter of transistor 88 and the collector is connected through a resistor 100 to the line 61' which leads to the rear release comparator 46'. The line 64 from the synchronization circuit 62 is connected through a resistor 102 to the base of the transistor 94.

The prime purpose of the turn-on transient circuit is to effect a brief brake release to exercise the brake pressure modulators when the ignition system of the vehicle is first energized. Upon such energization, the voltage Z+ first appears. Initially, the base of the transistor 88 will be at a low potential since the capacitor 84 is not charged and the transistor 88 will therefore conduct to energize line 61 simultaneously. This permits the transistor 94 to conduct to energize line 61'. After a very brief delay, the capacitor 84 becomes charged sufficiently to turn off the transistors 88 and 94 whereupon the output signals cease. The short pulses on line 61 and 61' are sufficient to energize the release comparators to cause a brief brake release. The secondary purpose of the turn-on transient circuit is to cause a release of the rear brakes only when the line 64 is energized. When that occurs, a low signal is impressed upon line 64 upon energization and that draws current from the base of the transistor 94 to cause conduction thereof to energize line 61' to effect rear brake release.

The common initial cycle logic circuit 58 has a pair of diodes 104 connected to lines 57 and 57' from the front and rear release comparators. The diodes are connected through a resistor 106 to the base of a transistor 108. The transistor base is connected to ground through a time delay capacitor 110 and a large resistor 112 in parallel. The transistor emitter is connected to the junction point of voltage dividing resistors 114 and 116 which extend between Z+ and ground while the collector is connected through a resistor 118 to the base of a transistor 120. The base of the transistor 120 is also connected to ground through a large resistor 122. The emitter is grounded and the collector is connected by voltage dividing resistors 124 and 126 to B+. The junction of resistors 124 and 126 is connected to the base of a transistor 128 which has its emitter connected to B+ and its collector connected directly to the initial cycle output line 59.

In operation, prior to any anti-lock brake release, the capacitor 110 is not charged so that the base of transistor 108 is at a low potential. Transistors 108, 120 and 128 will then be turned on to provide a high voltage signal on the output line 59. When a brake release signal is produced by either release comparator, line 57 or 57' will be energized to rapidly charge capacitor 110 and turn off the transistor, whereupon line 59 will drop to a low potential. At the end of the brake release period, the energized line 57 or 57' will return to a low potential and the capacitor 110 will slowly discharge through the large resistor 112. After a delay of about 2 seconds, the base of the transistor 108 will achieve a sufficient low voltage for all three transistors to turn on. However, during a normal series of anti-lock brake cycles, the release comparators will produce other brake release signals more frequently than one every 2 seconds so that the capacitor 110 will not become discharged and the voltage of line 59 will remain low until the entire series of brake release cycles is completed. Consequently, the initial cycle signal will appear on line 59 only prior to the first brake release in a series of release cycles and will not appear until two seconds after the termination of anti-lock brake operation. An additional output occurs on line 63 which is connected to the collector of transistor 120. This output is low when line 59 is at a high voltage and vice versa.

The synchronizing circuit 62 includes a transistor 130 having its base connected through a resistor 132 to line 63 and through a resistor 134 to ground. The emitter is grounded and the collector is connected through a diode 136 to line 76 which leads to the side of the front solenoid 50 nearest the driver 48. The collector of transistor 130 is also connected to Z+ through a resistor 138 and to the line 64 through a capacitor 140. A second transistor 142 has its base connected through a timing capacitor 144 to the collector of transistor 130 and through a resistor 146 to Z+. The emitter of the transistor 142 is grounded and the collector is connected through a load resistor 148 to B+ and through a diode 150 to an output line 78 which extends to the self-check circuit 66.

In operation, when the control is in the initial cycle mode, and the potential on line 63 is low, the transistor 130 will be non-conducting and its collector will be at a high potential. When a front brake release occurs, assuming there has been no rear release, the front driver 48 connects the front solenoid to ground so that the line 76 and the collector of the transistor 130 instantly assume a low potential. Then the capacitor 140 discharges to provide a current pulse on line 64 which briefly triggers the transistor 94 in the turn-on transient circuit 60 to energize line 61' which effects rear brake release for perhaps 30 milliseconds. In the meantime, the initial cycle logic circuit 58 is in the process of switching in response to the front solenoid release. However, its action is somewhat slower than that of the synchronizing circuit due to the time delay effected by the capacitor 110 and resistor 106. When the initial cycle switching is completed, line 63 assumes a high potential and the transistor 130 is turned on so that its collector is held low. Thereafter, so long as the initial cycle circuit remains in its new state, the capacitor 140 cannot recharge and the synchronizing circuit can cause no further release of the rear brakes. During the initial cycle mode, the transistor 142 will be conducting and its collector will be at a low potential. However, when the initial cycle logic circuit switches to turn on transistor 130 or the line 76 is grounded through the front driver, the capacitor 144 will deliver a discharge pulse to turn off the transistor 142 for one-tenth of a second to produce a corresponding high voltage pulse on line 78.

Referring now to the sensor logic circuit 66a, a portion of the self-check circuit, the line 26 carrying the pulses representing the lowest front wheel speed is connected through a differentiating capacitor 152 and the resulting pulses are transmitted through a diode 154 to the base of a transistor 156. A diode 153 and a resistor 155 provide a discharge path to ground. The base is further connected to ground through a biasing resistor 158. The emitter is grounded and the collector is connected through a resistor 160 to the line 59 carrying the initial cycle signal. The collector is further connected to ground through a timing capacitor 162 as well as to line 164. In operation, when the initial cycle signal is present on line 59, the capacitor 162 tends to become charged to produce a high potential on line 164. However, the pulses from the capacitor 152 periodically turn on the transistor 156 to keep the capacitor 162 discharged providing that the pulses arrive in rapid succession. When the vehicle has a significant speed, say 1 mile per hour, and the front wheels are turning normally, the pulses from the capacitor 152 are adequate to keep the capacitor 162 discharged unless there is a malfunction in a front wheel sensor such as a short therein or a broken connection between the sensor and control circuit. Thus the potential on line 164 is a measure of front wheel sensor integrity provided the vehicle has a significant speed. A second circuit which operates like that just described has an input on line 80 from the output of the rear squaring amplifier 16'. The circuit includes a capacitor 152', a diode 153', a diode 154', a resistor 155', a transistor 156', a resistor 158', a resistor 160', a capacitor 162', and an output line 166. The resistor 160' is connected to Z+ so that the circuit is operative to monitor the rear squaring amplifier 16' to produce a high voltage output on line 166 whenever the rear sensor has a malfunction or the rear wheels are at a very low speed or stopped as would occur when the rear brakes lock.

The line 34 carrying a DC voltage proportional to the highest front wheel speed is connected through a resistor 168 to the base of a transistor 170 which in turn is connected through a filtering capacitor 172 to ground. The emitter is connected to the junction of voltage dividing resistors 174 and 176 which extend from Z+ to ground and the collector is connected through a resistor 178 to the base of a transistor 180, which base is further connected to Z+ through a bias resistor 182. The collector of transistor 180 is connected directly to a line 184 and the emitter is connected to Z+. The resistors 174 and 176 are so selected that the transistor 170 will conduct only when the vehicle speed as represented by the voltage on line 34 exceeds a threshold of approximately 4 mph. Above that threshold, the transistor 170 conducts to permit the transistor 180 to conduct and place a high voltage on line 184. A transistor 186 has its collector connected directly to line 184, its emitter connected through a load resistor 188 to ground while its base is connected to lines 164 and 166 through resistors 190 and 192 respectively. Thus, when the voltage on line 184 is high, and the voltage on line 164 or line 166 is high, the transistor 186 will conduct and its collector will be at a high voltage. The output line 194 is connected to the collector. Thus the line 194 will have a high voltage when the maximum front wheel speed exceeds the 4 mph threshold, and indicated rear speed is very low or the indicated lowest front speed is very low during initial cycle operation. In short, a high signal on line 194 represents a sensor malfunction or a wheel speed abberation which is undesirable should it continue for an extended time period. A transistor 196 has its collector connected to line 184, its emitter connected to ground through a load resistor 198 and its base connected to the line 166 through a resistor 200. When the lines 184 and 166 carry high voltages, transistor 196 will conduct to impress a high voltage on an output conductor 202 connected to the emitter. Thus a high voltage on line 202 represents a malfunction of the rear sensor or locked rear brakes while the vehicle speed exceeds 4 mph. The output lines 194 and 202 are connected to the self-check circuit 66.

The self-check circuit 66 includes a timer comprising a capacitor 204 connected to Z+ and connected in series through resistors 206 and 208 to the collector of a transistor 210 having a grounded emitter. A second transistor 212 having a grounded emitter has its collector connected to the junction of the resistors 206 and 208. A discharge path for the capacitor 204 is therefore defined by the resistors 206 and 208 and one or both of the transistors. A charging resistor 214 and a diode 216 are serially connected from Z+ to the capacitor 204. The resistor 214 is further directly connected to the collector of the transistor 210. When only transistor 210 is conducting, the capacitor 204 will discharge through both resistors 206 and 208. The component values are selected to provide a time period of 2.5 seconds. When, however, transistor 212 as well as transistor 210 is conducting, the net resistance in the discharge path is somewhat lower so that a timing period of 0.6 seconds is effected.

A control disabling circuit includes a transistor 218 having its base connected between the timing capacitor 204 and the discharge resistor 206 while its emitter is connected to the junction point of voltage dividing resistors 220 and 222 extending between Z+ and ground. The collector is connected to the base of a transistor 224 and through a biasing resistor 226 to ground. The emitter of transistor 224 is grounded and its collector is connected through a load resistor 228 to B+. The collector is also connected through a latching circuit containing a diode 230 to the base of the transistor 218. When the discharge of the capacitor 204 lowers the base potential of the transistor 218 below that of the emitter, that transistor will conduct causing transistor 224 to conduct so that its collector will be held near ground potential. The latching circuit imposes a similar low potential on the base of transistor 218 so that those two transistors are latched into conductive state, which cannot be changed until Z+ is removed by opening the vehicle ignition circuit. The output line 70 is connected to the collector of transistor 224 and is effectively grounded when the transistor 224 is conducting. As stated previously, this causes the input signals to both release comparators 46 and 46' to be grounded to disable operation of the anti-lock brake control so that vehicle braking will be returned to conventional manual control in the event of a malfunction.

Lamp driver circuitry includes a transistor 232 having its base connected through a resistor 234 to the collector of the transistor 224. Transistor 232 has a grounded emitter and its collector connected to B+ through a load resistor 236. The collector is also connected directly to the base of a transistor 238 having a grounded emitter and its collector connected through a load resistor 240 to B+. A third transistor 242 has its base connected directly to the collector of transistor 238 and has a grounded collector and its emitter connected through a feedback resistor 244 to the base of the transistor 238. The emitter of the transistor 242 is also connected to ground through a diode 246 and a resistor 248 in parallel and in addition, is connected to B+ through the warning lamp 68. The diode 246 serves to pass negative transients which might be present on the B+ line. In the normal state, when transistor 224 is non-conducting, transistor 232 will be turned on and transistors 238 and 242 will be turned off so that current through the lamp 68 will be negligible and the lamp will be dark. However, the small resistor 248 will permit sufficient current to warm the lamp filament to avoid current surges which occur when power is applied to a cold lamp filament. When, however, transistor 224 conducts, the subsequent transistors change state so that transistor 242 is conducting and the warning lamp 68 is illuminated. The B+ line connected to the lamp 68 is separate from the main B+ supply line to the control circuit so that as the power is lost on the main line, B+ power may still be applied to the lamp as well as to the base of the transistor 238 via the resistor 244, thereby turning on the transistors 238 and 242 to cause illumination of the lamp 68.

The timer and the disabling circuit described above are energized when the base of transistor 210 is subject to a high voltage or when the base of both transistors 210 and 212 are subject to a high voltage. As mentioned above in connection with the sensor logic circuit 66a, when the highest front wheel speed exceeds 4 mph and the rear squaring amplifier 16' indicates a very low output, a high voltage is impressed on lines 194 and 202 which are connected to the bases of transistors 210 and 212 through resistors 247 and 249 respectively.

This voltage will turn on transistors 210 and 212 to cause the timing circuit to time out in 0.6 seconds so that the control circuit is disabled if the indicated rear speed malfunction continues for that short period. This will occur, for example, when the rear brakes are locked and the front brakes are in an anti-lock cycling mode. This is an undesirable condition and disabling the control circuit prevents a continuation of that condition. When one front wheel sensor indicates a speed higher than 4 mph and the other indicates a very low speed during the initial cycle period, i.e., prior to a brake release, then the line 194 only carries a high voltage to cause conduction of the transistor 210 causing the timing circuit to time out in 2.5 seconds to disable the control circuit.

Another sensor monitoring circuit, the sensor check circuit 20, is also provided to trigger the timing circuit. The sensor check circuit includes a transistor 250 having its collector connected through a large resistor 252 to Z+ and its emitter connected to the high side of the right front sensor 12. The collector is also connected to a line 21 leading to the base of the transistor 210 through a diode 254. The base of the transistor 250 is connected to Z+ through a bias resistor 256 and also serves as the input line to the squaring amplifier 18. When the sensor 12 is properly connected to the control, there will be a continuous circuit from the emitter of the transistor 250 to ground through the low impedance of the sensor 12. Then the transistor will conduct to impose a low voltage onto line 21. When, however, the sensor 12 is disconnected, or there is a discontinuity within the sensor, the transistor 250 will be turned off and a high voltage will be present on line 21 to cause operation of the timing circuit. This feature provides assurance that at least one vehicle sensor is in circuit with the control and can provide a basis for comparing the outputs of the other sensors in the sensor logic circuit 66a.

To detect a condition of extraordinary long brake release, there is provided a transistor 258 having its base connected through resistors 260 and 260' to the lines 76 and 76' leading to the front and rear solenoids. The collector is grounded through a resistor 262 and the emitter is connected to the junction of voltage dividing resistors 264 and 266 which extend between B+ and ground. The collector is connected through a resistor 268 to the base of the transistor 210. Thus, when either solenoid is energized, the base of transistor 258 will be near ground potential and the transistor will conduct to turn on the transistor 210 and start timing. Obviously the control will be disabled if the solenoid release continues for 2.5 seconds. An exception to this occurs at the time that the initial cycle signal terminates. As mentioned previously, the synchronizing circuit 62 impresses a positive 0.1 second pulse on line 78 upon the termination of the initial cycle signal. This pulse is fed directly to the base of the transistor 258 to turn off that transistor for 0.1 second thereby allowing the timing circuit to reset.

As set forth in the above-mentioned application Ser. No. 806,807, the brake modulator contains a normally closed switch which becomes opened when the modulator is actuated to cause a brake release. This enables monitoring a failure of a modulator in the release position. The modulator switches 74 and 74' each have one side connected to ground and the other side connected to line 59 carrying the initial cycle signal through resistors 268 and 268'. Resistors 270 and 270' are placed across the switches 74 and 74'. The high voltage side of each switch is connected through a resistor 272 or 272' to the base of the transistor 210 in the timing circuit. Thus, during the initial cycle period when the line 59 is energized, a high voltage will be carried to the transistor 210 base if either switch is opened, but this will not occur when both switches are closed. Thus, if a switch is open for 2.5 seconds prior to the first brake release, the control will be disabled.

In summary, the logic statements for the combined self-check circuit 66 and sensor logic circuit 66a as follows:

First, the 2.5 second timer is activated if any of the following conditions occur:
1. The system is in the initial cycle mode (there has been no anti-lock brake release) and any of the following occur:
   a. Either modulator switch is open, or
   b. The maximum front wheel speed is greater than the threshold (4 mph) and the speed signal from the other front wheel is substantially zero.
2. The right front sensor is open circuited.
3. The output voltage of either solenoid driver is low (except that the timer is reset at the termination of the initial cycle mode).

The second logic statement is: The 0.6 second timer is actuated when the maximum front wheel speed is greater than threshold (4 mph) and the output of the rear squaring amplifier is nearly zero Hz.

The third logic statement is: The controller will be disabled and illuminate the brake warning light if either timer times out or B+ to the controller is lost.

It is thus apparent that the subject circuit provides for monitoring a number of conditions in an anti-lock brake control circuit to disable the control in the event of a malfunction and in particular monitors the integrity of wheel speed sensors by monitoring circuits which are controlled by the sensors, and allow the sensors to be grounded at one side.

The embodiment of the invention described herein is for purposes of illustration and the scope of the invention is intended to be limited only by the following claims.

It is claimed:

1. In an anti-lock brake control for a vehicle having a plurality of braked wheels and a plurality of sensors for detecting speed of the wheels, a failure monitoring circuit for detecting a sensor malfunction comprising
   means for determining when one of the sensor outputs exceeds a predetermined value, and producing a first signal indicating a minimum vehicle speed,
   means for determining when another sensor output is below a lower predetermined value and producing a second signal,
   means producing a third signal only prior to the first brake release effected by the anti-lock brake control, and
   means responsive to the first, second and third signals for disabling the anti-lock brake control when all signals are present whereby the control is rendered inoperative by a sensor malfunction as indicated by an output below the predetermined value occurring at a minimum vehicle speed prior to an anti-lock brake release.

2. In an anti-lock brake control for a vehicle having a plurality of braked wheels and a plurality of sensors for detecting speed of the wheels, a failure monitoring circuit for detecting a sensor malfunction comprising means for determining when one of the sensor outputs exceeds a predetermined value, and producing a first signal indicating a minimum vehicle speed, means for determining when another sensor output is below a lower predetermined value and producing a second signal, means producing a third signal only prior to the first brake release effected by the anti-lock brake control, means for detecting circuit continuity between a sensor and the control and producing a fourth signal when continuity is absent, and means responsive to the first, second, and third signals for disabling the anti-lock brake control when those signals are present and responsive to the fourth signal for disabling the anti-lock brake control when the fourth signal is present whereby the control is rendered inoperative by a sensor malfunction as indicated by a discontinuity or by an output below the predetermined value occurring at a minimum vehicle speed prior to an anti-lock brake release.

3. In an anti-lock brake control for a vehicle having a plurality of braked wheels, and a wheel speed sensor for each non-driven braked wheel, a failure monitoring circuit for detecting a sensor malfunction comprising means for determining when one of the sensor outputs exceeds a predetermined minimum value to produce a first signal indicating a minimum vehicle speed, means operative prior to the first brake release of an anti-lock brake control cycle for determining when another sensor output is substantially nil to produce a second signal indicating a malfunction of the said another sensor, and means responsive to the first and second signal for disabling the anti-lock brake control when the first and second signals have been present for a predetermined time period, whereby a sensor malfunction prior to the first anti-lock brake release and during minimum vehicle speed renders the control inoperative.

4. In an anti-lock brake control for a vehicle having a pair of braked non-driven wheels each equipped with a wheel speed sensor and a pair of braked driven wheels equipped with at least one wheel speed sensor, a failure monitoring circuit for detecting a sensor malfunction comprising means for determining when one of the sensor outputs for the non-driven wheels exceeds a predetermined minimum value to produce a first signal indicating a minimum vehicle speed, means operative prior to the first brake release of an anti-lock brake control cycle for determining when the other sensor output for a non-driven wheel is substantially nil to produce a second signal indicating a malfunction of the said other sensor, means for determining when a driven wheel sensor output is substantially nil to produce a third signal indicating a malfunction of the said driven wheel sensor, logic means responsive to the said signals for producing an output when the first signal and either of the second and third signals are present, and timing means responsive to the logic output for disabling the anti-lock control when the logic output is present for a predetermined time.

5. In an anti-lock brake control for a vehicle having a pair of braked non-driven wheels each equipped with a wheel speed sensor, a pair of braked driven wheels equipped with at least one wheel speed sensor, and a squaring amplifier responsive to each sensor for shaping the pulses therefrom, each squaring amplifier having a frequency output according to sensor output, a failure monitoring circuit for detecting a sensor malfunction comprising means for determining when the non-driven wheel squaring amplifier having the highest output exceeds a predetermined minimum value to produce a first signal indicating a minimum vehicle speed, means operative prior to the first brake release of an anti-lock brake control cycle for determining when the other non-driven wheel squaring amplifier output is substantially zero frequency to produce a second signal indicating a malfunction of the said other sensor, means for determining when a driven wheel squaring amplifier output is substantially zero frequency to produce a third signal indicating a malfunction of the said driven wheel sensor, logic means responsive to the said signals for producing an output when the first signal and either of the second and third signals are present, and timing means responsive to the logic output for disabling the anti-lock control when the logic output is present for a predetermined time.

6. In a four wheel anti-lock brake control for a vehicle having a pair of non-driven braked front wheels each equipped with a wheel speed sensor and a pair of driven braked rear wheels equipped with at least one wheel sensor, a failure monitoring circuit comprising means for determining when one of the front wheel sensor outputs exceeds a predetermined minimum value to produce a first signal indicating a minimum vehicle speed, means operative prior to the first brake release of an anti-lock brake control cycle for determining when the other front wheel sensor output is substantially zero to produce a second signal indicating a malfunction of the said other sensor, means for determining when a rear wheel sensor output is substantially zero to produce a third signal indicating a malfunction of the rear wheel sensor or a very low rear wheel speed, and timing means responsive to the said signals for disabling the anti-lock control when the first and second signals are present for one time period and for disabling the anti-lock control when the first and third signals are present for another time period.

* * * * *